United States Patent
Nishikawa et al.

(10) Patent No.: US 6,954,045 B2
(45) Date of Patent: Oct. 11, 2005

(54) DRIVING FORCE CONTROL SYSTEM FOR HYBRID VEHICLE

(75) Inventors: Ryo Nishikawa, Saitama (JP); Yusuke Tatara, Saitama (JP); Akihiro Yamamoto, Saitama (JP); Kazunari Takahashi, Saitama (JP)

(73) Assignee: Honda Motor Co., Tokyo (JP)

( * ) Notice: Subject to any disclaimer, the term of this patent is extended or adjusted under 35 U.S.C. 154(b) by 39 days.

(21) Appl. No.: 10/716,675

(22) Filed: Nov. 20, 2003

(65) Prior Publication Data

US 2004/0104699 A1 Jun. 3, 2004

(30) Foreign Application Priority Data

Nov. 29, 2002 (JP) .................................. P. 2002-347664

(51) Int. Cl.⁷ ................................................. H02P 3/00
(52) U.S. Cl. ..................... 318/376; 318/375; 318/59; 318/60; 701/70; 180/65.2; 180/65.5
(58) Field of Search ................................ 318/376, 375, 318/59, 60, 382, 55, 56, 76; 701/70; 180/65.2, 65.5

(56) References Cited

U.S. PATENT DOCUMENTS

| | | | | |
|---|---|---|---|---|
| 5,549,840 A | * | 8/1996 | Mondin et al. ............. | 510/365 |
| 5,895,100 A | * | 4/1999 | Ito et al. .................... | 303/152 |
| 6,041,877 A | * | 3/2000 | Yamada et al. ............ | 180/65.2 |
| 6,406,105 B1 | * | 6/2002 | Shimada et al. ............ | 303/152 |
| 6,454,354 B1 | * | 9/2002 | Vossmann et al. .......... | 297/367 |
| 6,454,364 B1 | * | 9/2002 | Niwa et al. ................. | 303/152 |
| 6,528,959 B2 | * | 3/2003 | Kitano et al. ................ | 318/55 |
| 6,569,055 B2 | * | 5/2003 | Urasawa et al. .............. | 477/5 |
| 6,598,945 B2 | * | 7/2003 | Shimada et al. ............ | 303/152 |

FOREIGN PATENT DOCUMENTS

JP 2002-235576 8/2002

* cited by examiner

Primary Examiner—Rita Leykin
(74) Attorney, Agent, or Firm—Arent Fox, PLLC.

(57) ABSTRACT

There are provided as drive sources an engine 2, a front motor 3 provided on a front wheels 8 side of the vehicle and a rear motor 4 provided on a rear wheels 9 side of the vehicle, and in executing a regeneration of deceleration energy when braking, a regeneration capacity of the front motor 3 and a regeneration capacity of the rear motor 4 are calculated, respectively, so that the regeneration is executed with either of these motors 3, 4 which can provide a larger regeneration capacity.

6 Claims, 6 Drawing Sheets

DRIVING FORCE CONTROL SYSTEM FOR HYBRID VEHICLE

BACKGROUND OF THE INVENTION

The present invention relates to a driving force control system for a hybrid vehicle which has an engine, a primary electric motor and a secondary electric motor as drive sources of the vehicle.

Relationally, there is proposed a driving force control system for controlling driving force of a vehicle which has an engine and a motor as drive sources thereof.

For example, Patent Literature No. 1 discloses a driving force control system for a hybrid vehicle in which front wheels are driven by an engine and rear wheels are driven by a motor.
[Patent Literature No. 1]
JP-A-2002-235576 (paragraph Nos. 0009, 0012, FIG. 1)

In the aforesaid related art, however, the motor only functions as an electric motor, and a generator for driving the motor is driven by the engine, there being provided no mechanism for recovering running energy when braking. Due to this, in order to improve further the fuel economy, it is desired to provide motors which function not only as an electric motor but also as a generator on the front wheel and rear wheel sides of the vehicle, respectively, so that regeneration can be performed by the motors when the vehicle is decelerated.

However, since there happens to exist a case where the specifications and performances of the electric motor (for example, the front motor) for driving the front wheels and the electric motor (the rear motor) for driving the rear wheels differ from each other and the regeneration capacities of the motors also differ depending on running conditions of the vehicle, there is caused a problem that it cannot always be said that the regeneration performed simply by the respective motors is efficient.

SUMMARY OF THE INVENTION

To cope with this, an object of the invention is to provide a driving force control system for a hybrid vehicle which can enable electric motors to perform efficient regenerations.

With a view to attaining the object, according to a first aspect of the invention, there is provided a driving force control system for a hybrid vehicle in which either front wheels or rear wheels (for example, front wheels 8 or rear wheels 9 in an embodiment that will be described later on) are driven by an engine (for example, an engine 2 in the embodiment that will be described later on) and a primary electric motor (for example, a front motor 3 in the embodiment that will be described later on) and the other of the front wheels and rear wheels are driven by a secondary electric motor (for example, a rear motor 4 in the embodiment that will be described later on), characterized in that in performing a regeneration of deceleration energy when braking, a regeneration capacity of the primary electric motor and a regeneration capacity of the secondary electric motor are calculated, respectively, so that the regeneration is performed with either of the electric motors which can provides a larger generation capacity.

According to the first aspect of the invention, since, when braking, excess running energy can be recovered effectively by performing regeneration with the electric motor that provides the larger regeneration capacity of the regeneration capacities so calculated, energy can be used more effectively. In addition, since the regeneration is executed with only one of the primary and secondary electric motors, the other electric motor is allowed to execute another independent control to thereby increase the degree of freedom of the running mode, whereby the other electric motor can be controlled so as to contribute to an increase in fuel economy depending on the running conditions of the vehicle. For example, the other electric motor may be driven alone or together with the engine so as to provide a driving force to the vehicle or may be put at rest.

According to a second aspect of the invention, there is provided a driving force control system for a hybrid vehicle as set forth in the first aspect of the invention, wherein an efficiency of a transmission (for example, a transmission 5 in the embodiment that will be described later on) connected to the primary electric motor and a transmission loss experienced by a rear differential are taken into consideration when calculating a regeneration capacity of the primary electric motor, and wherein an efficiency of the rear differential (for example, a rear differential 10 in the embodiment that will be described later on) connected to the secondary electric motor and a transmission loss experienced by the transmission are taken into consideration when calculating a regeneration capacity of the secondary electric motor.

According to the second aspect of the invention, since the capabilities of the primary and secondary electric motors can be calculated with higher accuracy, a more efficient regeneration control can be performed.

According to a third aspect of the invention, there is provided a driving force control system for a hybrid vehicle as set fort in the first or second aspect of the invention, further comprising a clutch for bringing the engine and the primary electric motor into engagement with and disengagement from the wheels, wherein, when the engine and the primary electric motor are in disengagement from the wheels by the clutch, the regeneration is performed by the secondary electric motor.

According to the third aspect of the invention, since a transmission of engine friction to the wheels can be prevented when the vehicle runs at extremely low speeds, energy loss due to engine friction can be reduced, and by executing the regeneration with the second electric motor which is not affected by the engine friction, excess running energy can be recovered more efficiently.

According to a fourth aspect of the invention, there is provided a driving force control system for a hybrid vehicle as set forth in the third aspect of the invention, where the clutch is a starter clutch of the transmission.

According to the fourth aspect of the invention, since the existing clutch of the transmission is used, the necessity of providing a new special (novel) clutch is obviated, so that the number of components involved can be reduced, thereby making it possible to attempt to reduce the production costs.

According to a fifth aspect of the invention, there is provided a driving force control system for a hybrid vehicle as set forth in any of the first to fourth aspects of the invention, wherein, when a slippage of the wheels is detected, the regeneration in the primary electric motor and the secondary electric motor is prohibited.

According to the fifth aspect of the invention, since a variation in rotational speed of the wheels in association with the regeneration in the slipping condition where the wheels slip can be prevented, the behavioral stability of the vehicle can be secured, and an early recovery from the slipping condition can be attempted to be attained.

According to a sixth aspect of the invention, there is provided a driving force control system for a hybrid vehicle which comprises an engine, a primary electric motor provided on a front wheel side of the vehicle, a transmission for transmitting driving force of the engine and the primary electric motor to front wheels of the vehicle, a secondary electric motor provided on a rear wheel side of the vehicle, and a rear differential for connecting the secondary electric motor to rear wheels of the vehicle, comprising a regeneration possibility determination means for determining whether or not a regeneration in the primary electric motor and the secondary electric motor is possible, a regeneration capability calculation means for calculating a regeneration capability of the primary electric motor and the secondary electric motor, a regeneration capability comparing means for comparing the regeneration capability of the primary electric motor with the regeneration capability of the secondary electric motor, and a regeneration executing means for making either of the electric motors which can provide a larger regeneration capability execute a regeneration.

According to the sixth aspect of the invention, since excess running energy can be recovered effectively, more effective use of energy can be attained. In addition, depending on the running conditions of the vehicle, the other electric motor can be controlled so as to contribute to an increase in fuel economy.

DETAILED DESCRIPTION OF THE PREFERRED EMBODIMENTS

A driving force control system for a hybrid vehicle according to an embodiment of the invention will be described below by reference to the accompanying drawings.

Figure 1:
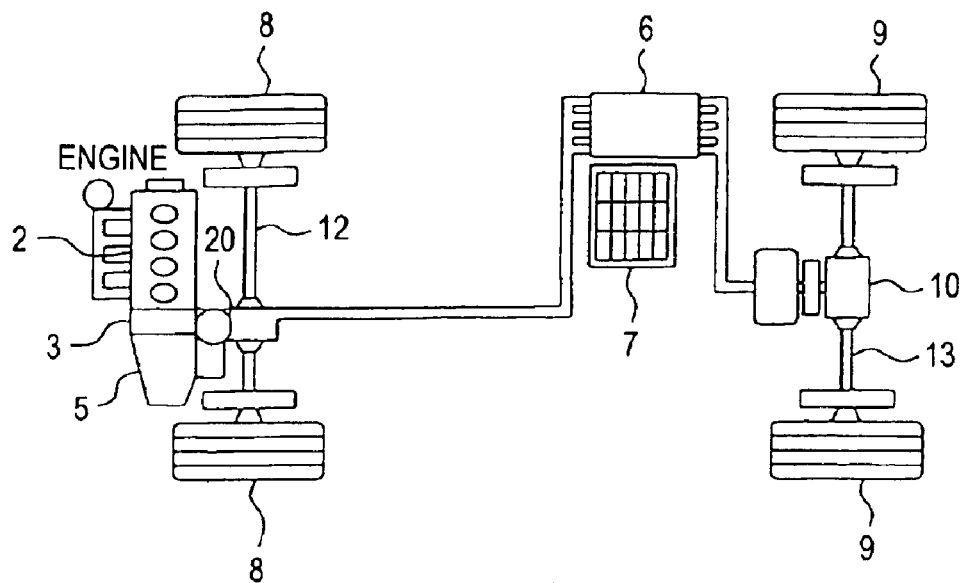
FIG. 1 is a schematic diagram illustrating the construction of a hybrid vehicle to which a driving control system for a hybrid vehicle according to a first embodiment of the invention is applied.

FIG. 1 is a schematic diagram showing the construction of a hybrid vehicle to which a driving force control system according an embodiment of the invention is applied. As shown in the same diagram, the hybrid vehicle 2 has an engine 2, a front motor 3 and a rear motor 4. The front motor 3 is connected in series to the engine 2 and the transmission 5 in such a manner as to be held therebetween. Then, power from at least one of the engine 2 and the front motor 3 is transmitted to an output shaft 12 via the transmission 5 so as to drive front wheels 8.

On the other hand, power from the rear motor 4 is transmitted to an output shaft 13 via a rear differential 10 so as to drive rear wheels 9. Namely, in this embodiment, the hybrid vehicle is a four-wheel drive vehicle in which the front wheels 8 can be driven by at least one of the engine 2 and the front motor 3, whereas the rear wheels 9 can be driven by the rear motor 4.

In addition, when driving force is transmitted from the front wheels 8 side to the front motor 3 side at the time of decelerating the hybrid vehicle, the front motor 3 functions as a generator so as to generate a so-called regenerative braking force and recovers kinetic energy of a vehicle body as electric energy. Similarly, when driving force is transmitted from the rear wheels 9 side to the rear motor 4 side at the time of decelerating the hybrid vehicle, the rear motor 4 functions as a generator so as to generate a regenerative braking force and recovers kinetic energy of the vehicle body to electric energy.

Driving and regenerating operations of the front motor 3 and the rear motor 4 are executed by a power drive unit (PDU) 6 which receives control commands from an ECU (not shown). A high-voltage nickel-hydrogen battery 7 is connected to the power drive unit 6 for exchanging electric energy with the front motor 3 and the rear motor 4, and the battery 7 is such as to include a plurality of modules which are arranged in series, each of the modules acting as a unit and including a plurality of cells which are connected to one another in series.

In addition, in the embodiment of the invention, the transmission 5 is constituted by a continuously variable transmission (CVT), and a starter clutch 20 is provided between the transmission 5 and the output shaft 12. By controlling the starter clutch 20, the engine 2 and the front motor 3 are brought into engagement with and disengagement from the front wheels 8, whereby the transmission and cut-off of energy can be executed between the drive sources and the front wheels 8.

Figure 3:
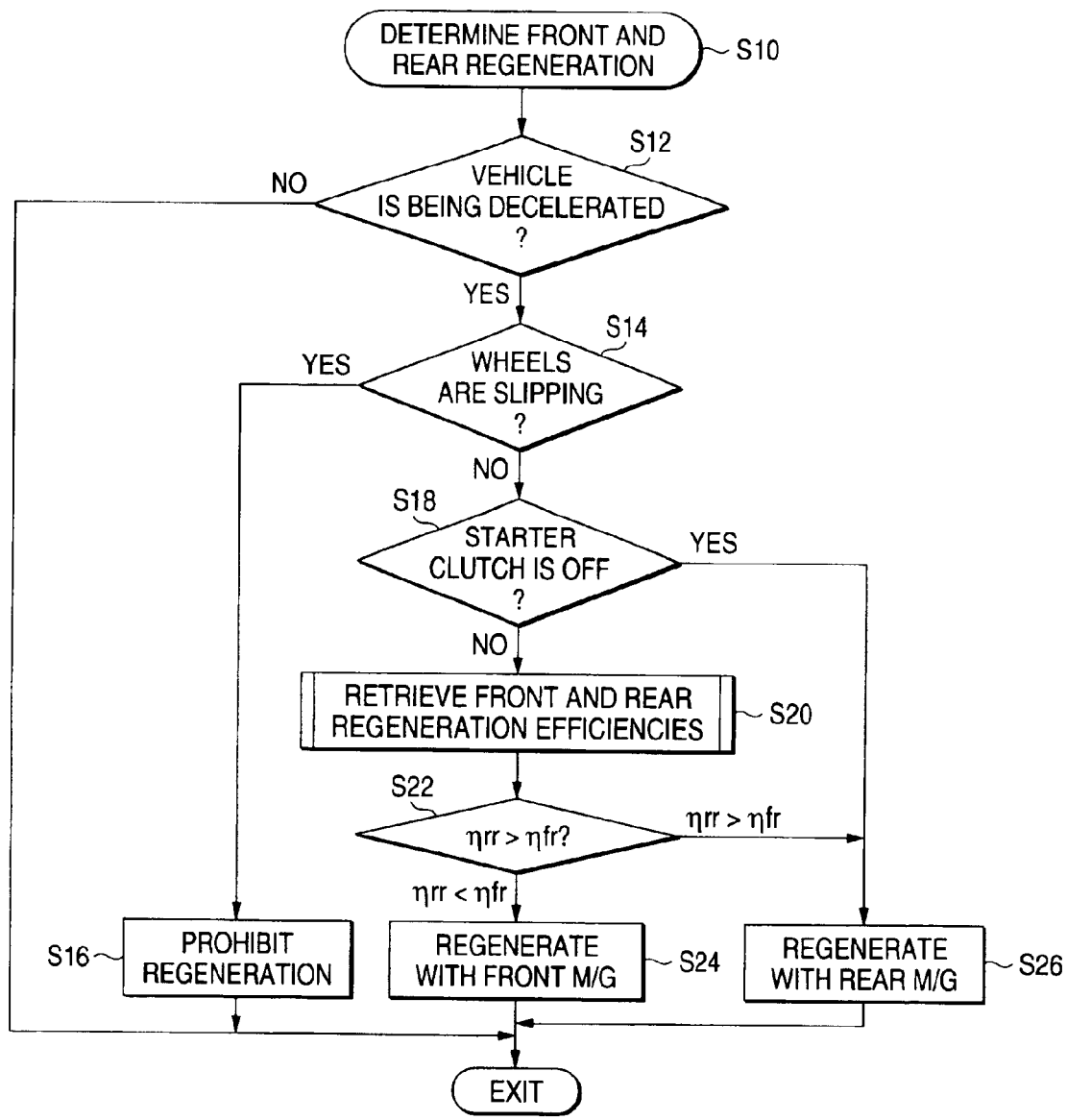
FIG. 3 is a flowchart illustrating a determination of regeneration efficiencies of a front motor and a rear motor which are shown in FIG. 1.

FIG. 3 is a flowchart illustrating a flow of determination of the regenerating efficiency of the front motor 3 and the rear motor 4 shown in FIG. 1. Firstly, when entering a determination mode for a regeneration process at the motors 3, 4 in step S10, whether or not the vehicle is being decelerated is determined in step S12. In case the result of the determination is YES, then advance to step S14 for execution of a process thereof, and in case the result of the determination is NO, end the series of processes along the flowchart. This is because a regeneration process should not be performed at any time except when the vehicle is being decelerated since it is preferable to perform a regeneration process by recovering excess running energy.

Whether or not the wheels 8, 9 are slipping is determined in step S14. In case the result of the determination is YES, a control to prohibit a regeneration is performed in step S16, and end the series of processes along the flow chart. Thus, since a regeneration is prohibited in the slipping condition where the wheels 8, 9 are slipping, a variation in rotational speed of the wheels 8, 9 in association with regeneration can be prevented, whereby the behavioral stability of the vehicle body can be secured, thereby making it possible to attempt to attain an early recovery from the slipping condition.

In addition, in case the result of the determination in step S14 is NO, then move to step S18 to shift the determination process to a process of determining which of the front motor 3 and the rear motor 4 is to be used for regeneration.

Whether or not the starter clutch 20 is disengaged (OFF) is determined in step S18. In case the result of the determination is YES, a control is performed to execute a regeneration with the rear motor (rear M/G) 4. This is because, when the starter clutch 20 is disengaged, the connection of the front motor 3 with the wheels 8, 9 is cut off, and hence no regeneration can be executed. Thus, with the starter clutch 20 being disengaged while the vehicle is running at extremely low speeds, energy loss due to engine friction can be reduced by allowing the rear motor 4 to execute a regeneration, whereby excess running energy can be recovered efficiently.

In case the result of the determination in step S18 is NO, then advance to step S20, where regeneration efficiencies of the respective motors 3, 4 are retrieved. This process will be described later on by using FIG. 4.

Then, move to step S22, where the regeneration efficiency $\eta rr$ of the rear motor 4 (referred to as a rear regeneration efficiency) is compared with the regeneration efficiency $\eta fr$ of the front motor 3 (referred to as a front regeneration efficiency, and in case the rear regeneration efficiency $\eta rr$ is larger than the front regeneration efficiency $\eta fr$, move to step S26, where a control is performed to execute a regeneration with the rear motor 4, whereas in case the rear regeneration efficiency $\eta rr$ is smaller than the front regeneration efficiency $\eta fr$, move to step S28, where a control is performed to execute a regeneration with the front motor 3. Then, end the series of processes.

Figure 4:
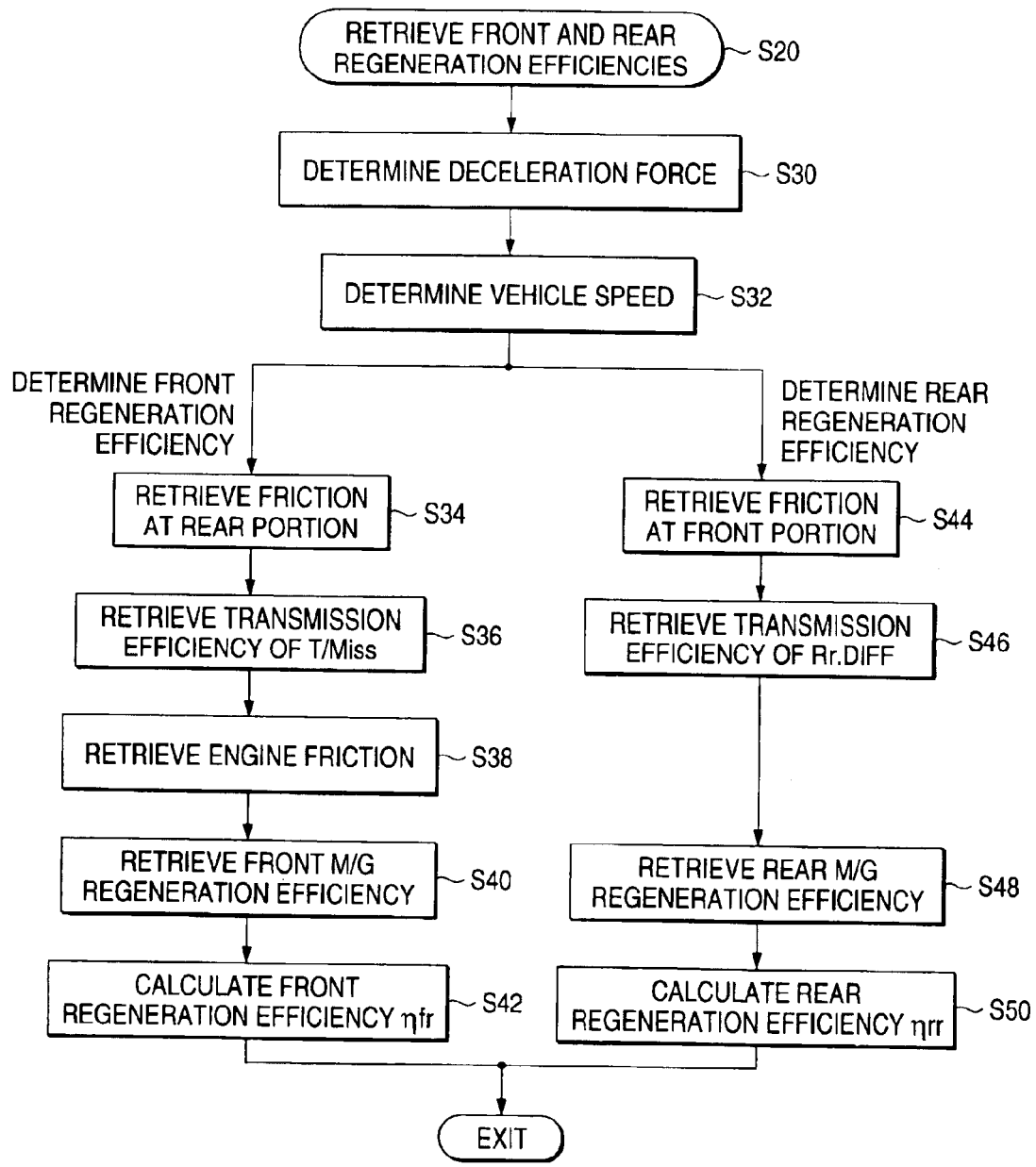
FIG. 4 is a flowchart illustrating a retrieving procedure of the regeneration efficiencies of the respective rear motor and front motor which are shown in FIG. 3.
Figure 5:
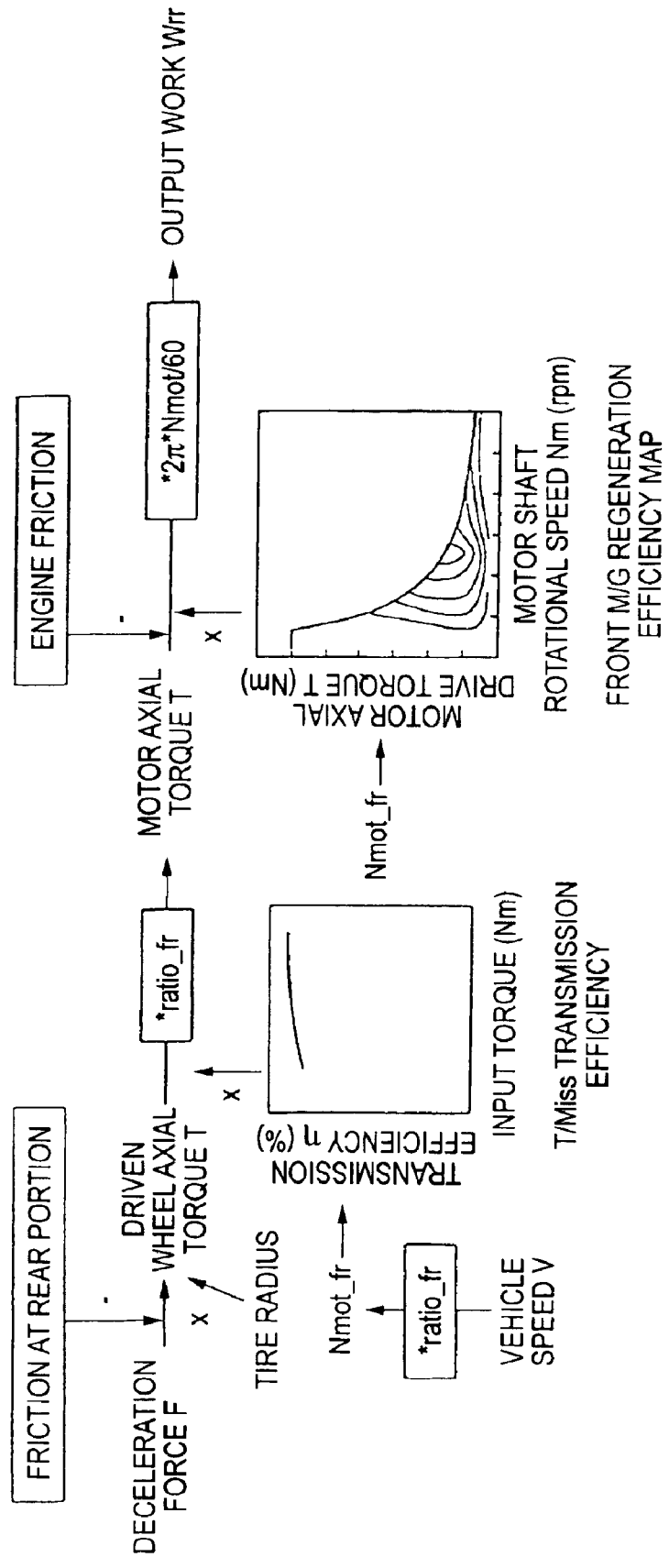
FIG. 5 is an explanatory diagram illustrating a procedure of calculating a regeneration capability of the front motor shown in FIG. 1.
Figure 6:
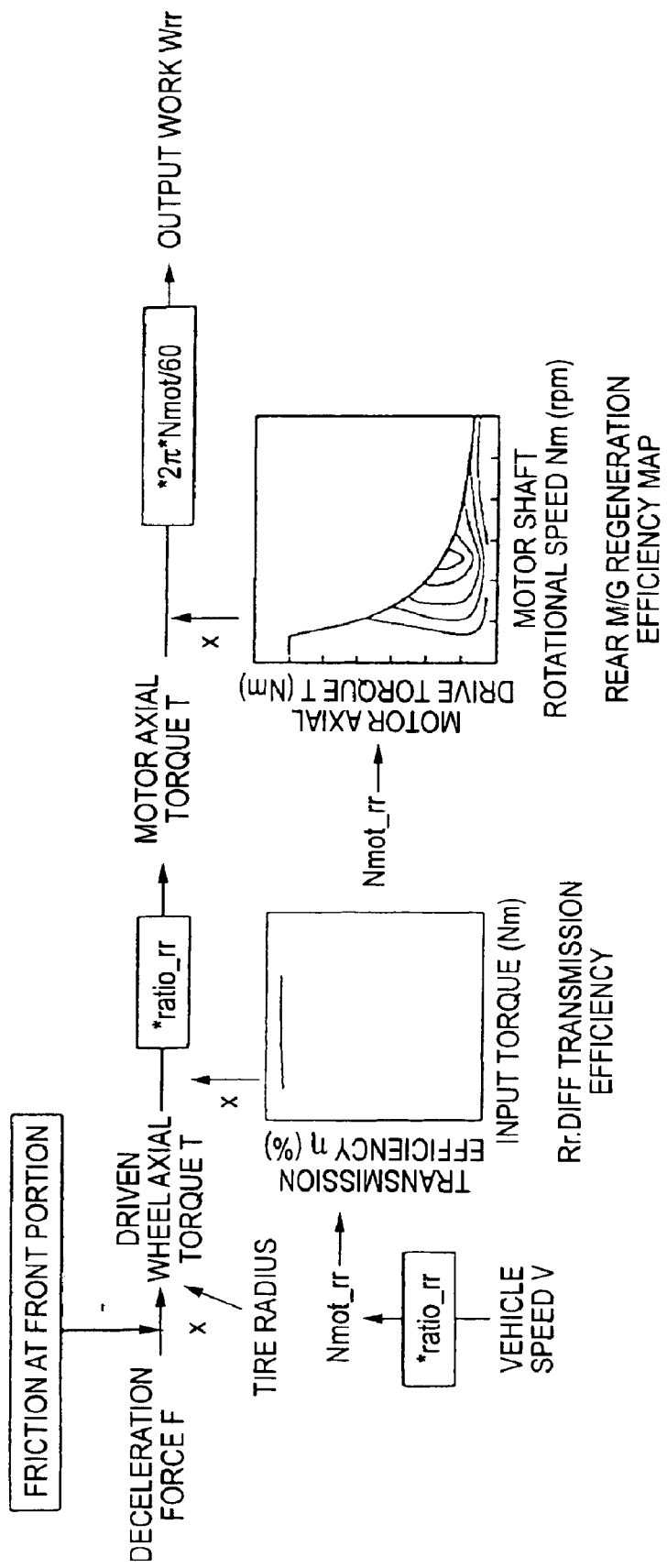
FIG. 6 is an explanatory diagram illustrating a procedure of calculating a regeneration capability of the rear motor shown in FIG. 1.

A procedure for calculating a regeneration efficiency for each of the motors 3, 4 will be described using FIGS. 4 to 6. FIG. 4 is an explanatory diagram illustrating, respectively, retrieving procedures of the regeneration efficiencies of the rear motor 4 and the front motor 3 which are shown in FIG. 3. FIGS. 5, 6 are explanatory diagrams illustrating procedures for calculating regeneration capabilities of the front motor 3 and the rear motor 4, respectively.

Firstly, a deceleration force F is calculated in step S30. This deceleration force F can be calculated from a brake pedal depressing amount. Then, the vehicle speed V is detected in step S32. Then, a front regeneration efficiency and rear regeneration efficiency will be determined as below.

In retrieving a front regeneration efficiency, a friction at a rear portion (the rear motor 4 and auxiliaries in association therewith) is calculated in step S34. A driven wheel axial torque T is calculated by subtracting the friction so calculated from the deceleration force F, and then multiplying the value so resulting from the subtraction by a radius R of the wheel 8.

In addition, a shaft rotational speed Nmot_fr of the front motor 3 is calculated by multiplying the vehicle speed V by a front side proportional coefficient ratio_fr. Then, in step S36, a transmission efficiency $\eta$ of the transmission 5 is map retrieved from the shaft rotational speed Nmot_fr and an input torque T, and the driven wheel axial torque T is multiplied by the transmission efficiency $\eta$. Furthermore, an axial torque T of the front motor 3 (referred to as a front axial torque) is calculated by multiplying the value so resulting from the multiplication by the proportional coefficient ratio_fr.

Then, in step S38, a friction of the engine 2 is calculated based on the vehicle speed V, and the friction so calculated is then subtracted from the front axial torque T. Following this, in step S40, a regeneration efficiency of the front motor 3 is map retrieved from the shaft rotational speed Nmot_fr and the front axial torque T, and in step S42, a front regeneration efficiency $\eta fr$ is calculated from the map. An output work $\eta fr$ is calculated by multiplying the front axial torque T resulting from the subtraction by the front regeneration efficiency $\eta fr$, and further multiplying the motor rotational speed Nmot by $2\pi$ and dividing the product so resulting by 60. This output work Wfr so calculated becomes a regeneration capability of the front motor 3.

On the other hand, in retrieving a rear regeneration efficiency, in step S44, a friction at a front portion (the front motor 3 and auxiliaries in association therewith) is calculated. The driven wheel axial torque T is calculated by subtracting this friction so calculated from the deceleration force F, and then multiplying the value resulting from the subtraction by a radius of the wheel 9.

In addition, a shaft rotational speed Nmot_rr of the rear motor 4 is calculated by multiplying the vehicle speed V by a rear side proportional coefficient ratio_rr. Then, in step S46, a transmission efficiency $\eta$ of the rear differential 10 is map retrieved from the shaft rotational speed Nmot_rr and an input torque T, and the driven wheel axial torque T is multiplied by the transmission efficiency $\eta$. Furthermore, an axial torque T of the rear motor 4 (referred to as a rear axial torque) is calculated by multiplying the value so resulting from the multiplication by the proportional coefficient ratio_rr.

Then, in step S48, a regeneration efficiency of the rear motor 4 is map retrieved from the shaft rotational speed Nmot_rr and the rear axial torque T, and in step S50, and a rear regeneration efficiency $\eta rr$ is calculated from the map. An output work Wrr is calculated by multiplying the rear axial torque T resulting from the subtraction by the rear regeneration efficiency $\eta fr$, and further multiplying the motor rotational speed Nmot by $2\pi$ and dividing the product so resulting by 60. This output work Wrr so calculated becomes a regeneration capability of the rear motor 4.

Figure 7:
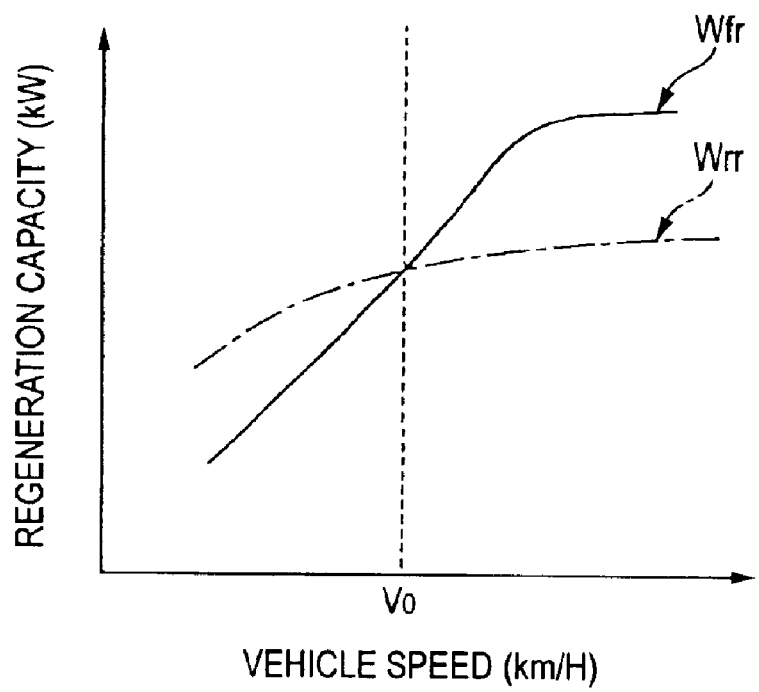
FIG. 7 is a graph illustrating a relationship between vehicle speeds and regeneration capacities of the front motor and the rear motor which are shown in FIG. 1.

FIG. 7 is a graph illustrating a relationship between vehicle speeds V in a constant running condition (for example, in a condition in which the starter clutch 20 is engaged) and regeneration capacities of the front motor 3 and the rear motor 4 which calculate as is described above. From the graph, the relationship between the front regeneration capacity Wfr and the rear generation capacity Wrr when the vehicle speed V is larger than a reference speed V0 is reversed in terms of magnitude from that when the vehicle speed V is smaller than the reference speed V0. Consequently, by comparing the vehicle speed V with the reference speed V0, the selection of the motors 3, 4 which perform the regenerating processes becomes possible. Note that the graph is changed as the running condition changes.

Figure 8:
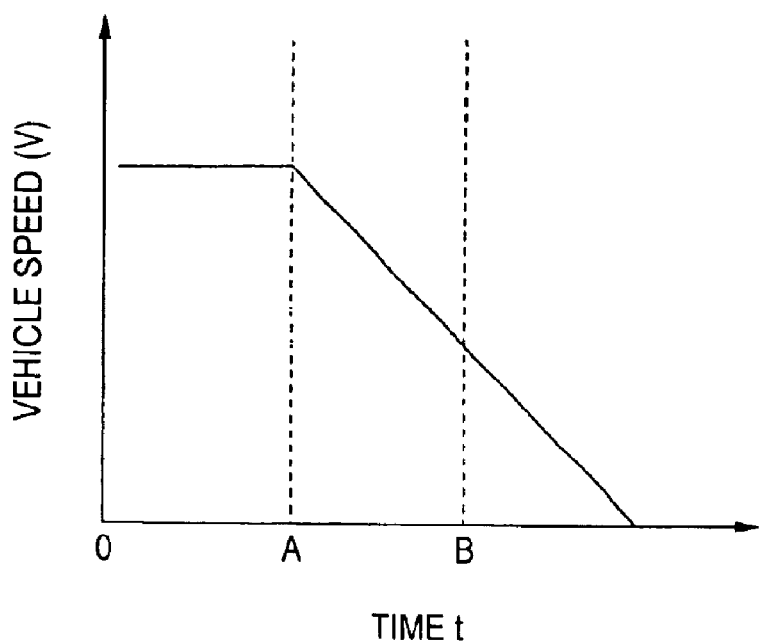
FIG. 8 is an explanatory diagram showing a running example of the hybrid vehicles shown in FIGS. 1, 2.

FIG. 8 is an explanatory diagram illustrating a running example of a hybrid vehicle. As illustrated in the diagram, when the vehicle runs at a constant speed, no regeneration process is carried out (time t=0~A). Then, when the vehicle starts to be decelerated so that a regeneration process can be carried out, as is described heretofore, a regeneration process is carried out with either of the motors 3, 4 (time t=A~B). Then, when the vehicle speed reaches an extremely low speed with the starter clutch 20 being OFF, a regeneration process is carried out with the rear motor 4 (time t=B~).

Thus, since excess running energy can be recovered effectively by executing the regeneration with either of the motors 3, 4 which can provide the larger regeneration capacity of those calculated when braking. In addition, since the regeneration is executed with only either (the front motor 3) of the front motor 3 and the rear motor 4, the other motor (for example, the rear motor 4) is allowed to perform another independent control to thereby increase the degree of freedom of the running mode.

In the embodiment of the invention, since the regeneration capabilities of the respective motors 3, 4 are calculated by taking into consideration the transmission losses experienced by the transmission 5 and the rear differential 10, the regeneration capabilities of the respective motors can be calculated with higher accuracy, thereby making it possible to perform a more efficient control of regeneration.

Figure 2:
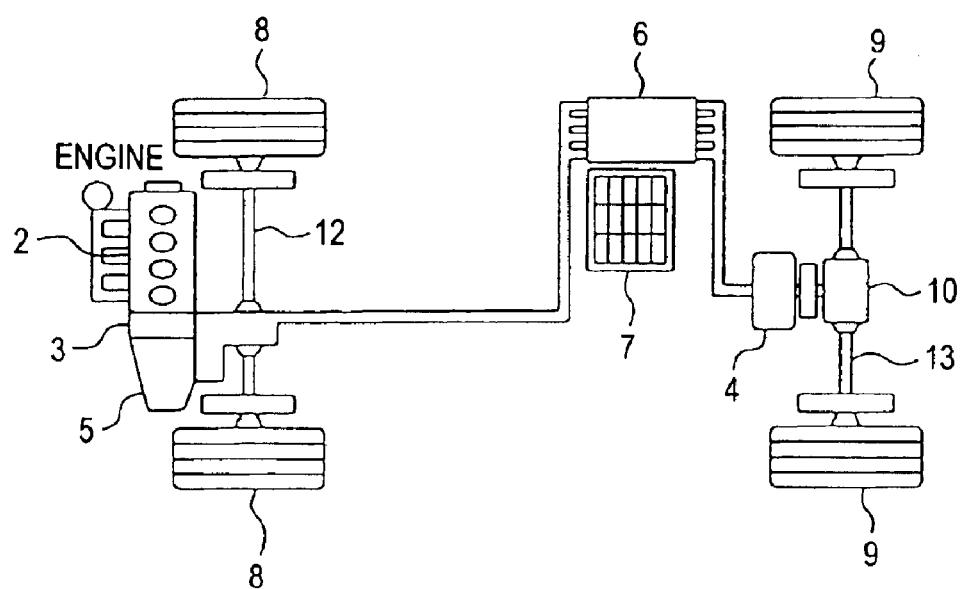
FIG. 2 is a schematic diagram illustrating the construction of a hybrid vehicle to which a driving control system for a hybrid vehicle according to a second embodiment of the invention is applied.

In addition, the invention can be applied not only the hybrid vehicle shown in FIG. 1 but also to a hybrid vehicle, shown in FIG. 2, which has no starter clutch 20. In this case, the control can be carried out similarly as with the hybrid vehicle shown in FIG. 1 except that the determination in step S18 always becomes NO.

Thus, as is described heretofore, according to the first aspect of the invention, since excess running energy can be recovered effectively, a more effective use of energy becomes possible. In addition, the other electric motor can be controlled so as to contribute to an increase in fuel economy depending on the running conditions of the vehicle.

According to the second aspect of the invention, since the regeneration capabilities of the first electric motor and the second electric motor can be calculated with higher accuracy, a more efficient regeneration control becomes possible.

According to the third aspect of the invention, the energy loss due to the engine friction can be reduced, and a more efficient recovery of excess running energy becomes possible.

According to the fourth aspect of the invention, the necessity of providing a new special (novel) clutch is obviated, whereby the number of components involved can be reduced, thereby making it possible to attempt to reduce the production costs.

According to the fifth aspect of the invention, the behavioral stability of the vehicle body can be secured, thereby making it possible to attempt to attain the early recovery from the slipping condition.

According to the sixth aspect of the invention, the effective use of energy becomes possible, and the other electric motor can be controlled so as to contribute to an increase in fuel economy.

What is claimed is:

1. A driving force control system for a hybrid vehicle, comprising:
   an engine,
   a primary electric motor,
   a secondary electric motor, wherein
   either front wheels or rear wheels are driven by the engine and the primary electric motor and the other of the front wheels and rear wheels are driven by the secondary electric motor, and
   in performing a regeneration of deceleration energy when braking, a regeneration capacity of the primary electric motor and a regeneration capacity of the secondary electric motor are calculated, respectively, so that the regeneration is performed with either of the electric motors which can provide a larger regeneration capacity; and
   a member for determining whether the primary electric motor or the secondary electric motor performs the regeneration based on the regeneration capacities of the primary and secondary electric motors.

2. The driving force control system for a hybrid vehicle as set forth in claim 1, wherein
   an efficiency of a transmission connected to the primary electric motor and a transmission loss experienced by a rear differential are taken into consideration when calculating a regeneration capacity of the primary electric motor, and an efficiency of the rear differential connected to the secondary electric motor and a transmission loss experienced by the transmission are taken into consideration when calculating a regeneration capacity of the secondary electric motor.

3. The driving force control system for a hybrid vehicle as set forth in claim 1, further comprising:
   a clutch for bringing the engine and the primary electric motor into engagement with and disengagement from the wheels, wherein
   when the engine and the primary electric motor are in disengagement from the wheels by the clutch, the regeneration is performed by the secondary electric motor.

4. The driving force control system for a hybrid vehicle as set forth in claim 3, wherein
   the clutch is a starter clutch of the transmission.

5. The driving force control system for a hybrid vehicle as set forth in claim 1, wherein
   when a slippage of the wheels is detected, the regeneration in the primary electric motor and the secondary electric motor is prohibited.

6. A driving force control system for a hybrid vehicle comprising:
   an engine,
   a primary electric motor provided on a front wheel side of the vehicle,
   a transmission for transmitting driving force of the engine and the primary electric motor to front wheels of the vehicle,
   a secondary electric motor provided on a rear wheel side of the vehicle,
   a rear differential for connecting the secondary electric motor to rear wheels of the vehicle,
   regeneration possibility determination means for determining whether or not a regeneration in the primary electric motor and the secondary electric motor is possible,
   regeneration capability calculation means for calculating a regeneration capability of the primary electric motor and the secondary electric motor,
   regeneration capability comparing means for comparing the regeneration capability of the primary electric motor with the regeneration capability of the secondary electric motor, and
   regeneration executing means for making either of the electric motors which can provide a larger regeneration capability execute a regeneration.

* * * * *